Dec. 3, 1940.  C. A. MEDSKER  2,223,456
FLUXER
Filed March 13, 1939  3 Sheets-Sheet 1

INVENTOR.
CHARLES A. MEDSKER
BY
Horace B. Fay,
ATTORNEY.

Dec. 3, 1940.  C. A. MEDSKER  2,223,456
FLUXER
Filed March 13, 1939  3 Sheets-Sheet 2

INVENTOR.
CHARLES A. MEDSKER
BY
Horace B. Fay.
ATTORNEY.

Dec. 3, 1940.   C. A. MEDSKER   2,223,456
FLUXER
Filed March 13, 1939   3 Sheets-Sheet 3

INVENTOR.
CHARLES A. MEDSKER
BY   Horace B. Fay,
ATTORNEY.

Patented Dec. 3, 1940

2,223,456

UNITED STATES PATENT OFFICE 2,223,456

FLUXER

Charles A. Medsker, Cleveland Heights, Ohio, assignor, by mesne assignments, to William L. Ulmer, Cleveland, Ohio Application March 13, 1939, Serial No. 261,559

3 Claims. (Cl. 261—99)

This invention relates, as indicated, to fluxers, but has reference more particularly to devices for use in entraining a flux in a stream of gas used in welding operations, such, for example, as disclosed in my applications, Serial Numbers 228,368 and 247,224.

A primary object of the invention is to provide a device of the character described in which the flux is distributed or dispersed in a finely divided form wherein it may be quickly and easily entrained by the gas, such as oxygen or combustible gas used in the welding operation.

Another object of the invention is to provide a device of the character described in which the gas-flux ratio may be varied within desirable limits.

A further object of the invention is to provide a device of the character described, which consists of a minimum number of easily assembled parts which are inexpensive to manufacture.

Other objects and advantages of the invention will be apparent during the course of the following description:

In the accompanying drawings, forming a part of this specification, and in which like numerals are employed to designate like parts throughout the same, Fig. 1 is a top plan view of one form of the device;

Figure 1:
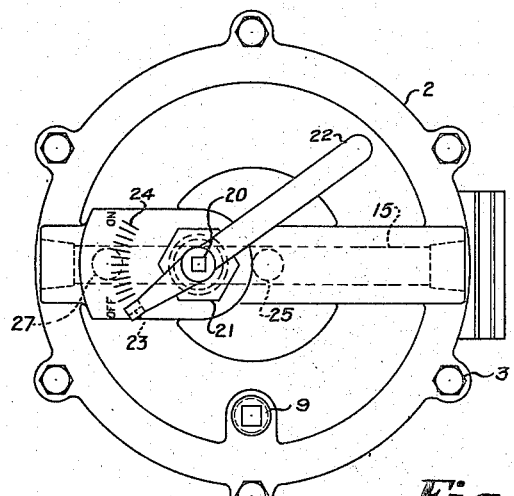
Figure 2:
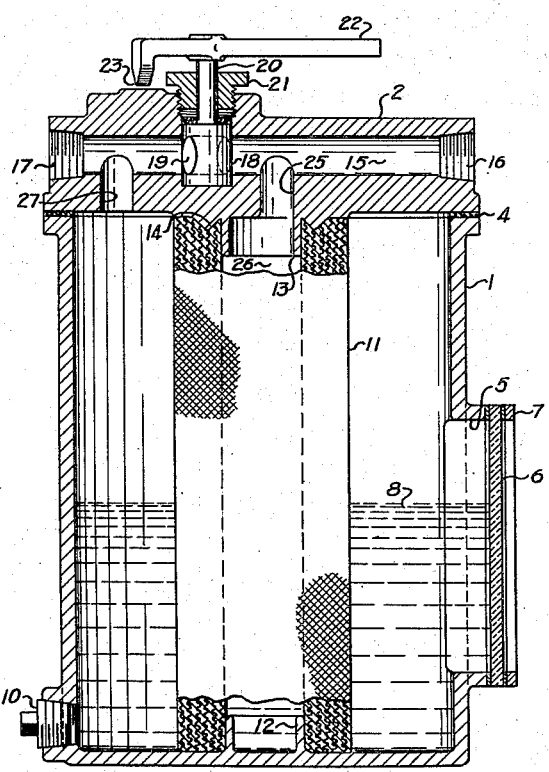
Fig. 2 is a vertical cross-sectional view of the device shown in Fig. 1.

Referring more particularly to Figs. 1 and 2 of the drawings, the device comprises a cylindrical casing or housing 1, which is closed at the bottom, and the opening at the top of which is normally closed, as by means of a cover 2, secured to the casing, as by means of bolts 3, a gasket of cork or the like 4 being interposed between the casing and cover to insure a gas-tight seal therebetween.

The casing 1 has an opening 5 in the side thereof, which is closed as by means of a sight glass 6, retained in position by a frame 7. By looking through the glass 6, the level of the flux 8, within the casing, may be ascertained at all times. The cover has an opening therein, which is normally closed, as by means of a plug 9, this opening serving as a filler opening through which the flux may be introduced into the casing from time to time to replenish the same and maintain it at the desired level. A drainage opening is also provided at the lower end of the casing, which is normally closed, as by means of a plug 10.

Disposed centrally of the casing, and with its axis extending vertically is a flux diffusing member in the form of a cylindrical wick 11, preferably formed of long staple cotton, and wound, for example, in the manner disclosed in the patent to Wardwell, No. 480,158. It is desirable that this member or wick be made of a material which has a high capillarity, and which, therefore, readily absorbs the flux 8. The wick 11 is maintained in its central position, and against displacement laterally by means of an annular upstanding flange 12 on the base of the casing, and a similar flange 13, which depends from the cover 2. It is maintained against displacement axially by means of the base of the casing and the cover. In order to provide a seal between the upper end of the wick 11 and the under surface of the cover 2, the material in the upper end of the wick is compressed to some extent by means of an annular projection 14 on the cover, which bites into the wick, as shown in Fig. 2.

Extending transversely through the cover 2 is a passageway 15 having an inlet 16 and an outlet 17. This passageway has disposed therein a plug cock 18 having an opening 19 extending therethrough of substantially the same diameter as the passageway 15, and a stem 20, which extends through a bushing 21, secured to the cover 2. The upper end of the stem 20 is squared and has secured thereto a handle 22 provided with an index point 23, designed to cooperate with graduations 24 on the cover 2. By turning the handle 22 the plug cock 18 may be turned to any desired position, so as to close the passageway 15, open it entirely by axially aligning the opening 19 with the passageway, or partially close the passageway. The graduations 24 are designed to indicate the extent to which the passageway is opened.

A passageway 25 communicates the passageway 15 at one side of the plug cock 18 with the interior 26 of the wick 11, and a similar passageway 27 communicates the space within the casing 1 exteriorly of the wick 11 with the passageway 15 at the other side of the plug cock 18.

In the use of the apparatus, the casing 1 is filled to the desired level with the flux 8, which is to be entrained in the gas used in the welding operations. The plug cock 18 is then set at the desired position, after which the gas which is to be used in the welding operation is admitted through inlet 16 into the passageway 15. A part or all of this gas will pass through the passageway 25 and into the interior 26 of the wick. This gas will pass outwardly from the space 26 and through the interstices of the wick, entraining therein the flux which has been soaked up by the upper portion of the wick. The gas-flux mixture which fills the space within the casing exteriorly of the wick then passes upwardly through the passageway 27 and into passageway 15, being conducted thence to the point of use.

Should it be found that too much flux is being entrained by the gas, the plug cock 18 may be turned so as to permit a larger proportion of the gas to pass through the opening 19 thereof. When the opening 19 is axially aligned with passageway 15, virtually none of the gas will pass through the wick, so that little or no flux will be entrained thereby. On the other hand, when the passageway 15 is completely closed off by the plug cock, all of the gas will pass through the wick, and the maximum amount of flux will be entrained by the gas.

In that form of the device shown in Figs. 3 to 8 inclusive, the construction is somewhat similar to that of the device shown in Figs. 1 and 2, with the exception that the device has incorporated therein a plurality of wicks, so that a greater flux entraining capacity is secured.

In this modified form of the device, the casing 1' has secured thereto, as by means of bolts 3' and nuts 3'', a cover 2'. This cover is provided on its lower surface with a boss 30 of generally U-shaped contour, and between the lower surface of which and the bottom of the casing are interposed four vertically-extending circumferentially spaced cylindrical wicks, 11', which are similar in every respect to the wick 11. The boss 30 is cored out to provide a U-shaped passageway 31, which communicates with the interior of each of the wicks 11' by means of vertical openings 32 in the boss 30, and has an inlet opening 25' leading thereinto from the passageway 15', as clearly shown in Fig. 4. The passageway 15' has an inlet 16' and an outlet 17'. An outlet opening 27' in the cover communicates the space in the casing between the wicks and the inner wall of the casing with the passageway 15'.

The passageway 15' is adapted to be closed as by means of a plug cock or valve 18' having an opening 19' extending therethrough of substantially the same diameter as the passageway 15', and a stem 20' which extends through a gland 21' secured to the cover 2', as by means of bolts 33. The upper end of the stem 20' is squared and has secured thereto a handle 22' provided with an index point designed to cooperate with graduations 24' on the gland 21'.

By turning the handle 22', the plug cock 18' may be turned to any desired position, so as to close the passageway 15', open it entirely by aligning the opening 19' with the passageway, or partially close the passageway, the graduations 24' being designed to indicate the extent to which the passageway is opened.

Figure 3:
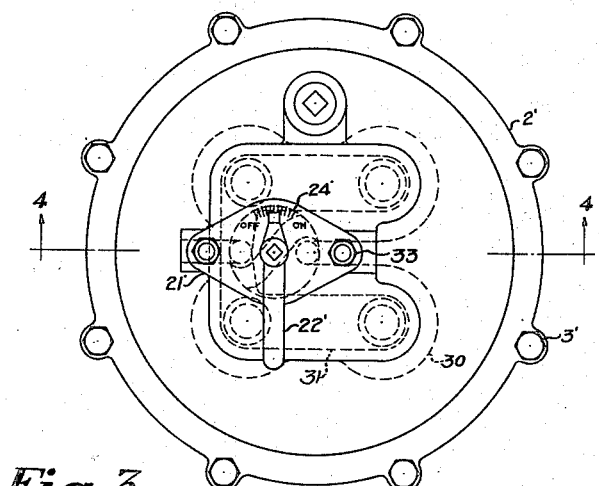
Fig. 3 is a top plan view of a modified form of the device.
Figure 4:
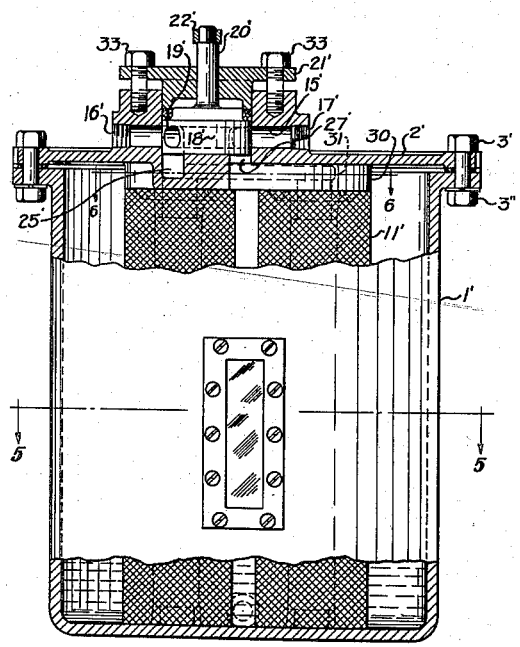
Fig. 4 is a vertical cross-sectional view, taken on the line 4—4 of Fig. 3.
Figure 5:
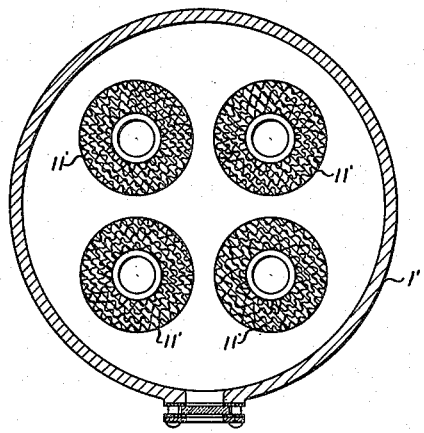
Fig. 5 is a horizontal cross-sectional view, taken on the line 5—5 of Fig. 4.
Figure 8:
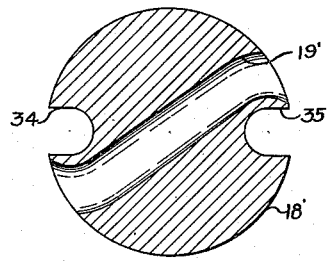
Fig. 8 is a cross-sectional view, taken on the line 8—8 of Fig. 7.
Figure 7:
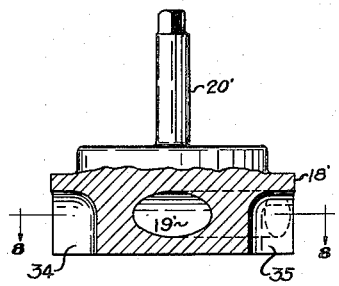
Fig. 7 is a view, partly in elevation and partly in section, of the valve of the fluxer shown in Figs. 3 and 4.
Figure 6:
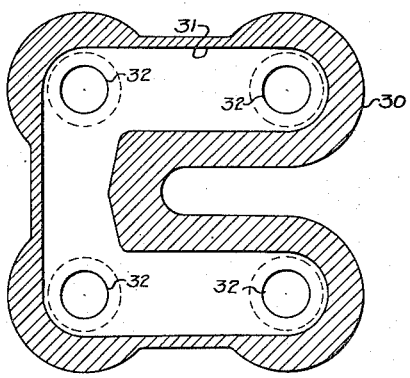
Fig. 6 is a fragmentary horizontal cross-sectional view, taken on the line 6—6 of Fig. 4.

The cock or valve 18' is peripherally recessed at points adjacent the ends of the opening 19', as at 34 and 35, these recesses being respectively adapted to establish communictaion between the passageway 15' and opening 25' and between the opening 27' and the passageway 15', as shown in Figs. 3 and 4.

With the valve 18' positioned, as shown in Figs. 3 and 4, the gas admitted into the inlet 16' will pass through recess 34, opening 25', passageway 31 and openings 32 into the interior of the wicks 11'. The gas will pass through the interstices of the wicks, entraining therein flux which is absorbed by the wicks, and out of the casing by way of the opening 27', recess 35 and outlet 17' to the point of use. By turning the valve 18' so as to partially align the opening 19' thereof with the passageway 15', a portion of the gas will pass directly through the valve, and the outgoing gas will therefore contain less flux.

Instead of passing the gas through the wicks, as described, the flux may be entrained in the gas by passing the gas through the space exteriorly or interiorly of the wick, and this can be accomplished by suitable modifications in the apparatus. In such cases, the gas, as it passes close to the wick, entrains the flux by a wiping action.

Moreover, instead of using hollow cylindrical wicks, wicks of any other desired shape or form may be used, as for example, solid wicks of rectangular cross-section.

It is to be understood that the forms of my invention, herewith shown and described, are to be taken as preferred examples of the same and that various changes in the shape, size and arrangement of parts may be resorted to, without departing from the spirit of my invention, or the scope of the subjoined claims.

Having thus described my invention, I claim:

1. In a device of the character described, a casing, a cover for said casing, a wick disposed within said casing and extending from the base of the casing to said cover, and wedge means carried by the under surface of said cover, the apex of said wedge means being adapted to bite into the upper end of the wick for providing a seal between the upper end of the wick and the under surface of the cover.

2. In a device of the character described, a casing, a cover for said casing, a wick disposed within said casing and extending from the base of the casing to said cover, and means providing a seal between the upper end of the wick and the under surface of the cover, said means comprising a projection on said cover which bites into the upper end wall of the wick and compresses the material of which the wick is composed.

3. In a device of the character described, a casing, a cover for said casing, a cylindrical wick disposed within said casing and extending from the base of the casing to said cover, the inner surface of said cover having an annular flange adapted for snugly projecting into said wick, and means for providing a seal between the upper end of the wick and the under surface of the cover, said means comprising an annular projection on the under surface of said cover which bits into the upper end wall of the wick and compresses the wick against said annular flange.

CHARLES A. MEDSKER.